United States Patent
Vuille et al.

(10) Patent No.: US 10,505,159 B2
(45) Date of Patent: Dec. 10, 2019

(54) BATTERY, PARTICULARLY A BUTTON CELL, AND METHOD FOR MANUFACTURE OF SUCH A BATTERY

(71) Applicant: The Swatch Group Research and Development Ltd, Marin (CH)

(72) Inventors: Pierry Vuille, Les Emibois (CH); Francois Erdemli, Colombier (CH); Pascal Haering, Muttenz (CH); Burhan Yildiz, Frenkendorf (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/879,596

(22) Filed: Jan. 25, 2018

(65) Prior Publication Data
US 2018/0241013 A1    Aug. 23, 2018

(30) Foreign Application Priority Data

Feb. 21, 2017   (EP) .................................... 17157252

(51) Int. Cl.
H01M 2/02    (2006.01)
H01M 2/04    (2006.01)

(52) U.S. Cl.
CPC ......... H01M 2/0222 (2013.01); H01M 2/027 (2013.01); H01M 2/0426 (2013.01); H01M 2/0465 (2013.01)

(58) Field of Classification Search
None
See application file for complete search history.

(56) References Cited

U.S. PATENT DOCUMENTS

| 2004/0146780 A1 | 7/2004 | Rubino et al. |
| 2006/0037190 A1 | 2/2006 | Rubino et al. |

(Continued)

FOREIGN PATENT DOCUMENTS

| EP | 1 441 400 A1 | 7/2004 |
| JP | 60-56358 | 4/1985 |

OTHER PUBLICATIONS

European Search Report dated Jul. 13, 2017 in European Application 17157252.2, filed on Feb. 21, 2017 (with English Translation of Categories of cited documents).

*Primary Examiner* — Ula C Ruddock
*Assistant Examiner* — Amanda Rosenbaum
(74) *Attorney, Agent, or Firm* — Oblon, McClelland, Maier & Neustadt, L.L.P.

(57) ABSTRACT

The present invention relates to a method for manufacturing a battery comprising a casing provided with a cup and a closure part for said cup, the method comprising the successive steps consisting in:
providing at least three parts with a first part defining one pole, and a second part and a third part defining the other pole and intended to form together the cup, the first and second parts respectively comprising a first surface and a second surface (6a) of matching shape, at least one adhesive portion of each of said surfaces extending in a geometric surface non-parallel to the general axis of the battery;
bonding the aforementioned first and second surfaces to provide a structure with an adhesive joint between the first and second parts;
welding the third part to the second part;
the adhesive joint being arranged against an inner face of the cup, the aforementioned adhesive portion of the second part (Continued)

forming a stop, along the general axis, for the first part, which is located inside the cup.

8 Claims, 4 Drawing Sheets

(56) References Cited

U.S. PATENT DOCUMENTS

| | | |
|---|---|---|
| 2006/0178708 A1 | 8/2006 | Rorvick et al. |
| 2014/0087239 A1 | 3/2014 | Tischendorf |
| 2015/0024290 A1* | 1/2015 | Csrenko ................ H01M 12/06 429/405 |
| 2015/0140417 A1* | 5/2015 | Matsumoto ......... H01M 2/0426 429/179 |

* cited by examiner

BATTERY, PARTICULARLY A BUTTON CELL, AND METHOD FOR MANUFACTURE OF SUCH A BATTERY

This application claims priority from European Patent Application No. 17157252.2 filed on Feb. 21, 2017, the entire disclosure of which is hereby incorporated herein by reference.

FIELD OF THE INVENTION

The present invention relates to a method for manufacturing batteries and, in particular, button cells. It also relates to the battery obtained by the aforementioned manufacturing method.

BACKGROUND OF THE INVENTION

Button cell batteries generally include a casing provided with a cup and a lid respectively forming the positive and negative poles of the battery. Conventionally, button cell batteries are sealed with a preformed elastomer seal which is positioned between the cup and the lid. This elastomer seal provides galvanic isolation between the poles and forms a barrier between the electrolyte contained inside the battery and the external environment. Such an assembly is disclosed, for example, in GB Patent No 1566061.

This assembly with a preformed crimped seal has the drawback of occupying a significant amount of space which will restrict the active volume of the battery. Further, it requires a step of folding the upper portion of the cup onto the lid to compress the elastomer seal and thus ensure sealed closure of the button cell.

To reduce the space allocated to the sealing junction, an adhesive joint instead of the preformed elastomer seal is a promising solution, but which raises some technical issues. Indeed, it is necessary to guarantee that the adhesive adheres properly to the surfaces to be assembled, and generally, to guarantee the mechanical and chemical resistance of the bonded assembly over time. In this respect, particular attention must be paid to the choice of adhesive and to the bonding procedure when the two poles of the casing are assembled. Those skilled in the art will choose, in particular, adhesives having low curing temperatures to avoid damage to the separator arranged inside the active material in the casing. Thus, it is recommended not to go beyond 70° C., which limits the opportunity to choose the most suitable adhesive for ensuring the best mechanical and chemical resistance of the assembly. Then, when the casing is sealed by bonding, particular care must be taken to avoid contaminating the adhesive or the bonding surfaces with the electrolyte which is generally present inside the casing, which would compromise the adhesion of the adhesive to the bonding surfaces and hence the mechanical resistance of the assembly.

SUMMARY OF THE INVENTION

The present invention proposes a new method for manufacturing batteries in order to gain active volume and improve the properties of a bonded assembly of the two poles of the battery.

To this end, there is proposed a manufacturing method and a battery according to the annexed claims.

The present invention proposes to manufacture the battery casing by assembling at least three parts; the first part serves to form one pole of the battery, while a second part and a third part are arranged to form together the other battery pole. In a main embodiment, once assembled, the second and third parts form a battery cup, which is closed in a sealed manner by the first part.

More specifically, the assembly is carried out in two phases. In a first phase, the first part and the second part are assembled by bonding to form a structure with an adhesive joint between its first and second parts, before any filling of the structure with liquid active material and even, in a preferred variant, also before any filling of the structure with solid active material. The adhesive joint is arranged to electrically isolate the first and second parts. This therefore avoids contaminating the adhesive, or the two surfaces intended to be bonded, with the electrolyte. Adding the active material after bonding also has the advantage of extending the choice of adhesives to adhesives requiring high curing temperatures. In a second phase, after filling the structure and/or the third part at least with the solid active material provided, the casing is closed by a weld between the third part and the structure.

One important feature of the manufacturing method according to the invention consists in arranging the adhesive joint so that it works mainly in compression, and not in traction, in case of internal overpressure. To this end, the first, second and third parts are formed and assembled so that a first portion of the first part, at least partially defining a first bonding surface, and a second portion of the second part, at least partially defining a second bonding surface, are arranged one opposite the other and each extend in a geometric surface that is not parallel to a general axis of the casing defined by the general alignment of its two poles. The second and third parts are welded together to form a cup with the aforementioned second portion forming a stop, in the direction of said general axis, for the first portion which is located inside the cup relative to the stop. The first part closes the cup in a sealed manner with the aid of the adhesive joint. The second surface is an inner surface of the cup against which the adhesive joint is arranged, and the bonding surface of the first part is thus disposed inside the cup. The adhesive joint is thus mainly stressed in compression and not in traction or shearing, under the effect of internal pressure inside the battery casing. As a result of this design, the adhesion of the adhesive joint will thus improve as the pressure increases, unlike an assembly with an adhesive joint positioned outside the cup.

The arrangement of the adhesive joint inside the cup is facilitated by the two-phase assembly method according to the invention. Indeed, by specifically designing and sizing the various parts of the casing, it is possible to obtain such an arrangement without flanging or crimping. More specifically, according to a preferred implementation, relative to the general axis of the casing, the second part has a minimum inner cross-section throughout its height, between an opening on one side and the aforementioned stop on the other side, this minimum inner cross-section having dimensions that are arranged to be greater than corresponding dimensions of the first part in projection into a plane transverse to the general axis. In the bonding step, the first part is inserted through the aforementioned opening into the second part and it is moved substantially along the general axis until the first portion is assembled to the second portion by an adhesive layer located between them and subsequently forming the adhesive joint.

It will be noted that welding in the presence of an electrolyte does not pose a particular problem as regards the quality of the welded joint obtained. At most, this could affect the aesthetic appearance of the welding area. However, a simple final cleaning step can overcome this potential problem. Thus, any slight overflow of the electrolyte during the positioning of the third part for welding (generally the active material is placed under pressure when the casing is closed) is burnt off when the weld is made.

As a result of the battery manufacturing method according to the invention, it is possible to select an adhesive suitable for its mechanical and chemical resistance, and to perform bonding in a perfectly clean environment, without any risk of degrading the adhesive prior to hardening, and especially avoiding contamination of the bonding surfaces of the two parts assembled by bonding.

BRIEF DESCRIPTION OF THE DRAWINGS

The invention will be described in more detail below with reference to the annexed drawings, given by way of non-limiting example, and in which.

DETAILED DESCRIPTION OF THE INVENTION

The present invention relates to a method for manufacturing a battery, in particular a button cell battery, which is assembled by bonding and welding starting with at least three parts.

Figure 1A:
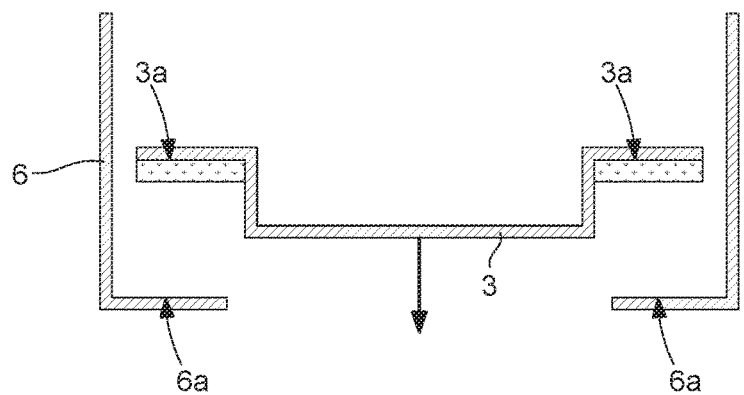
FIGS. 1a, 1b and 1c represent, in cross-sectional views, the successive steps of the battery manufacturing method according to the invention.
Figure 1B:
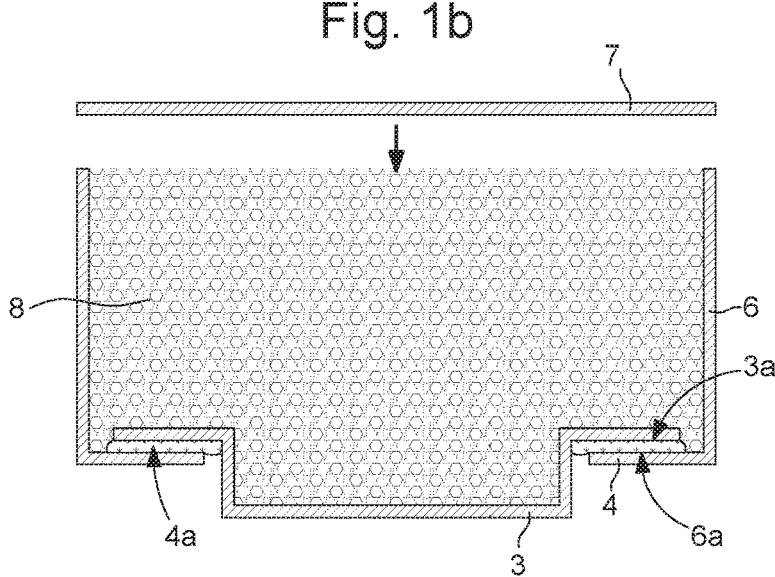
Figure 1C:
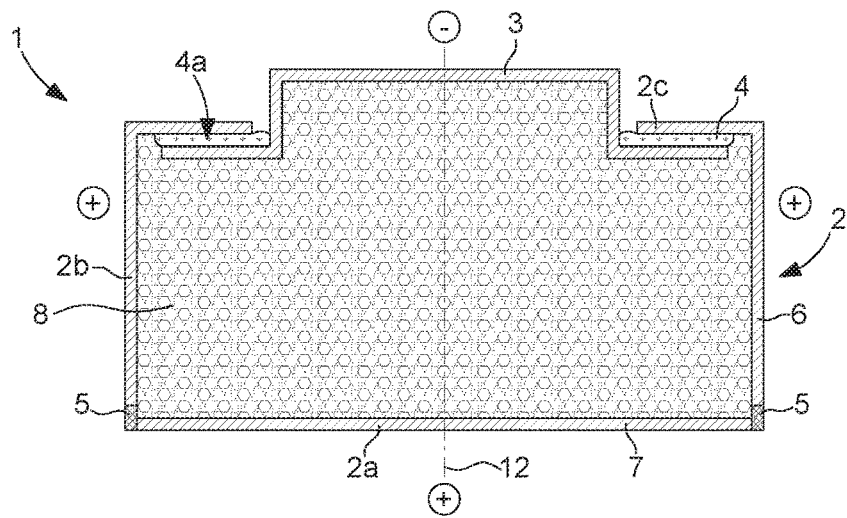
Figure 5:
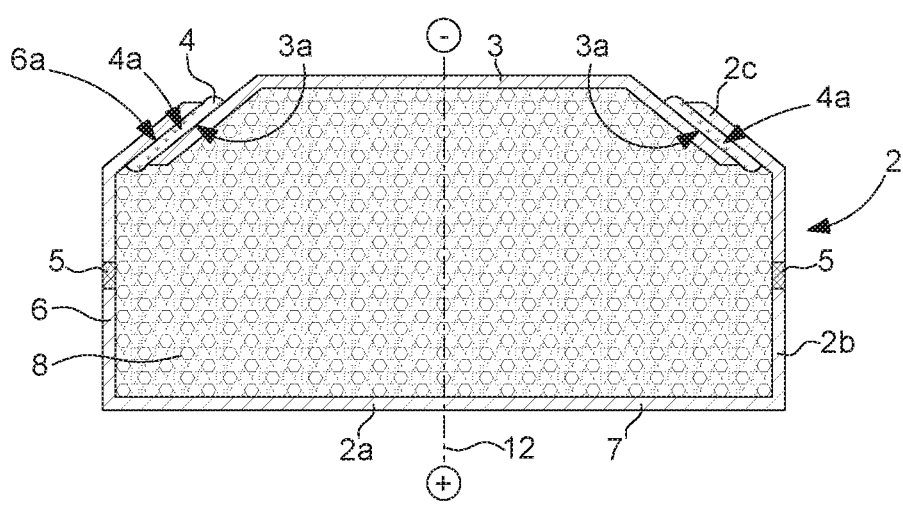
FIGS. 5 and 6 respectively represent variants of FIGS. 3 and 1c with the welded joint positioned at different places on the cup.
Figure 6:
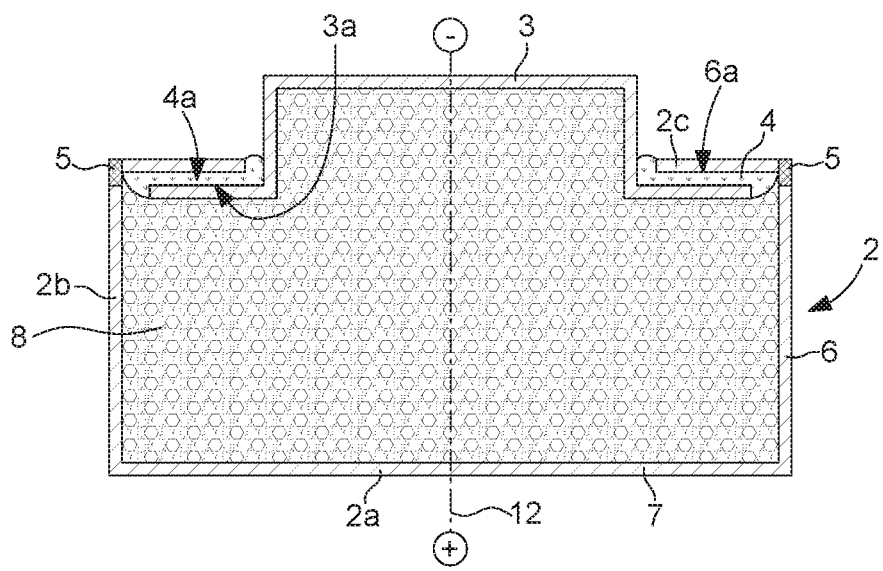

As illustrated in FIG. 1c, amongst others, the button cell, obtained from this manufacturing method, includes a metal casing 1 formed of a cup 2, defining the positive pole of the battery, and a closure part 3 defining the negative pole of the battery and closing the cup. According to the invention, the connection between the closure part and the cup is provided by an adhesive joint 4, and the connection between at least two parts forming the cup is provided by a weld or solder 5, with or without the addition of material, which is called hereafter the "welded joint". Also according to the invention, the adhesive joint is disposed on an inner face of cup 2 and the welded joint may be positioned at different places on the cup. For example, it may be positioned at the junction between the bottom 2a and the side wall 2b of cup 2 (FIG. 1c), on side wall 2b at a variable height (FIG. 5) or at adhesive joint 4 at the junction between side wall 2b and a rim 2c of the cup (FIG. 6).

Figure 2:
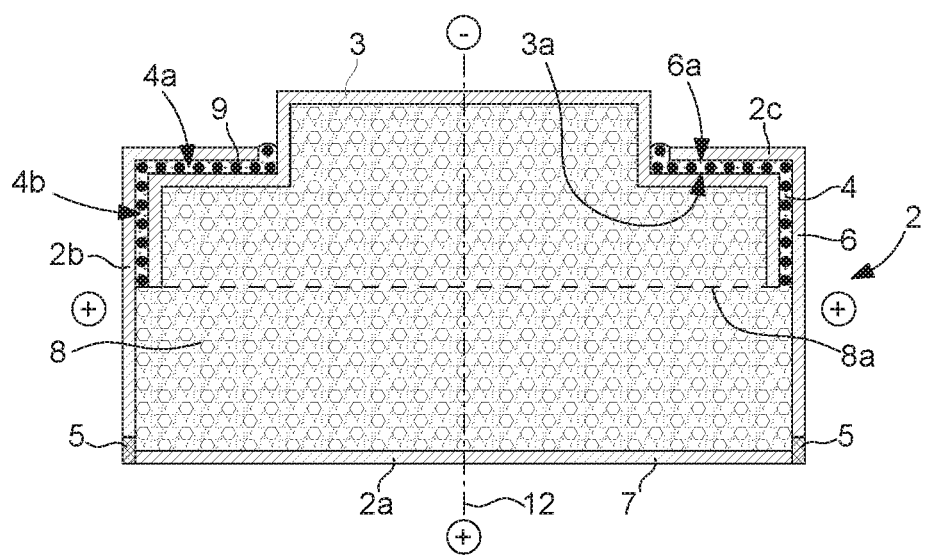
FIGS. 2 to 4 represent in cross-section several variants of the battery casing obtained by the manufacturing method according to the invention. These different variants differ in the geometry of the upper part of the casing and hence in the geometry of the adhesive joint. Further, in FIG. 2, the adhesive joint advantageously includes spacers.
Figure 3:
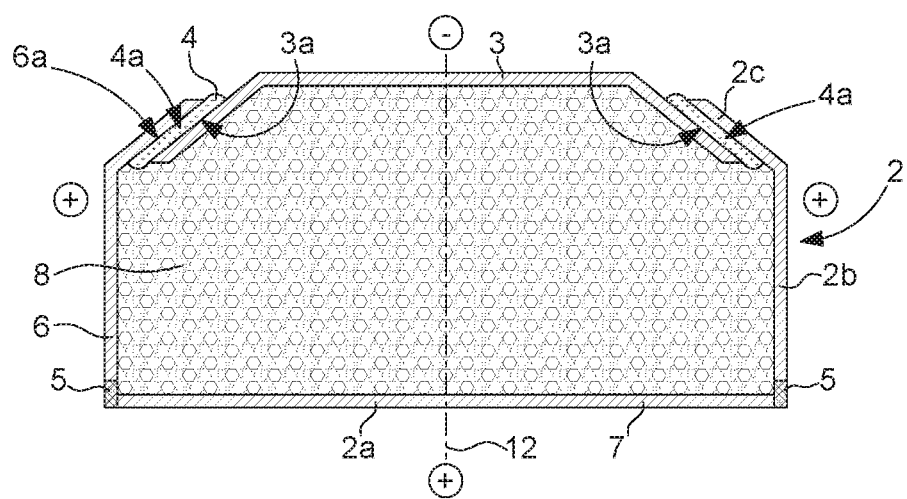
Figure 4:
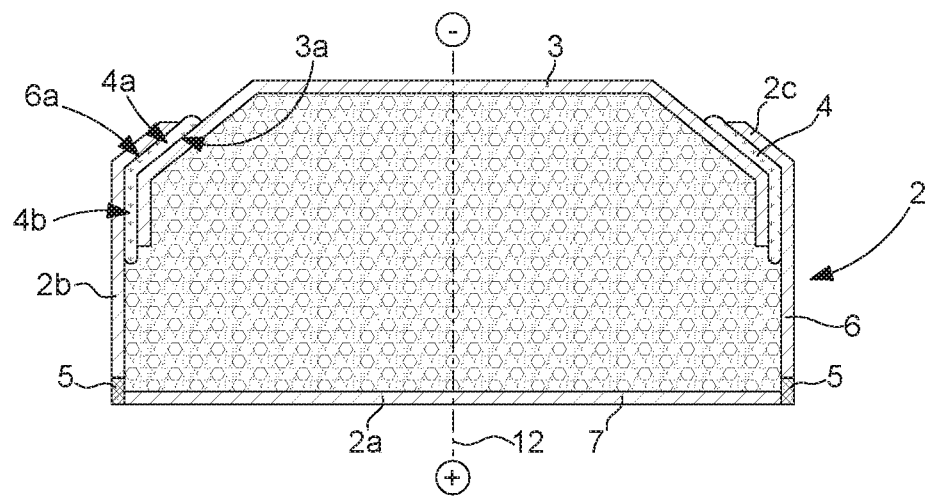

According to the invention, adhesive joint 4 is formed of at least one portion 4a which extends in a surface non-parallel to the general axis 12 of the battery, whose orientation is defined by the two poles. This general axis also defines a central axis of the battery here. In the particular case of a battery with a mainly cylindrical container structure, this means that the adhesive joint includes a portion of non-cylindrical shape. This portion of the adhesive joint will advantageously be stressed in compression in case of overpressure inside the casing, which guarantees proper mechanical resistance of the adhesive joint. In the examples given in FIGS. 1, 2 and 6, portion 4a is perpendicular to general axis 12, while in the examples of FIGS. 3 and 4, it is biased with respect to general axis 12, thus forming a truncated surface. In addition to portion 4a which is non-parallel to general axis 12, in a variant, adhesive joint 4 may comprise a portion 4b parallel to the general axis (FIGS. 2 and 4).

To obtain the casing, the manufacturing method according to the invention includes several steps described below. At least three parts are provided. A first part 3 is provided to form a cup closure element. Although the bonding surface of this first part is, within the scope of the present invention, located inside the general volume defined by cup 2, it will nonetheless also be called a "lid". This first part 3 includes a bonding surface 3a which extends in a non-parallel surface with respect to general axis 12.

A second part 6 and a third part 7 are intended to form cup 2 of the casing after welding. The geometry of these parts may vary according to the desired shape of the casing. In the illustrated examples, the container structure of the casing is mainly cylindrical but other geometries (triangular, rectangular) are easily achievable. In this regard, it will be noted that the manufacturing method according to the invention is well suited to the manufacture of cases with side edges. Indeed, unlike a crimped elastomer seal, an adhesive joint or a welded joint does not present any sealing issues in the areas close to these side edges. The second part includes a bonding surface 6a of matching shape to that 3a of the first part, i.e. which extends in a non-parallel surface with respect to general axis 12. This bonding surface 6a is disposed on an inner face of second part 6 or, in the case of a flat second part (FIG. 6), on a surface intended to define an inner surface of the cup after welding to the third part. The second part is intended to form rim 2c of the cup and, depending on the variant, all or part of side wall 2b of the cup. Once the casing is assembled, third part 7 is intended to form bottom 2a of the cup and, depending on the variant, all or part of the side wall of the cup.

In a first step schematically shown in FIG. 1a, the first and second parts are bonded to each other. More specifically, surface 3a of first part 3 is assembled by bonding to surface 6a of second part 6 by inserting the first part into the second part through the opening in this second part located on the side intended to define the bottom of the casing after manufacture. To perform this step, the second part is arranged to have, relative to the general axis thereof defining the general axis of alignment of the poles of the assembled casing, a minimum inner cross-section throughout its height between, on one hand, the opening on the bottom side and, on the other hand, a stop for the first part, this stop being formed by portion 2c of the second part which is turned towards the inside of the cup and which defines bonding surface 6a. The minimum inner cross-section has dimensions that are arranged to be greater than the corresponding dimensions of the first part in projection into a plane transverse to the general axis. In the case of a circular battery, this means that the inner diameter of the second part is arranged to be greater than the diameter of the first part. For a rectangular battery, it is thus the inner width and length of the second part which are respectively greater than the width and length of the first part. Thus, in the bonding step, the first part is inserted into the second part through a first opening, having the largest dimensions, and moved, substantially along the general axis, in the direction of a second opening of smaller dimensions, until the first portion is connected to the second portion by an adhesive layer located between them, this adhesive layer forming, once hardened, an adhesive joint ensuring rigid assembly of the two poles of the battery and the galvanic isolation therebetween.

The resulting structure with the first and second parts assembled by an adhesive joint 4 can form a container able to receive the active materials (FIGS. 1 to 5) before the welding step described below.

The adhesive used may be an epoxy, acrylate, polyurethane or other adhesive. The possible selection is broad, since the manufacturing method according to the invention does not impose limits on curing temperatures, because the assembly is bonded before the addition of active material and, where necessary, a separator for such active material.

Preferably, the adhesive joint has a substantially constant thickness. The thickness of the adhesive joint can be controlled by means of a spacer 9 (see FIG. 2). This therefore ensures a minimum thickness of the adhesive joint, which is arranged to achieve the desired galvanic isolation between the two poles. A 'spacer' means both a set of elements arranged in the sealing junction, such as particles or studs, and a continuous structure such as a fabric. The spacer may be pre-incorporated in the adhesive before the latter is deposited or positioned on one or both of the surfaces to be assembled before the adhesive is deposited.

Figure 7:
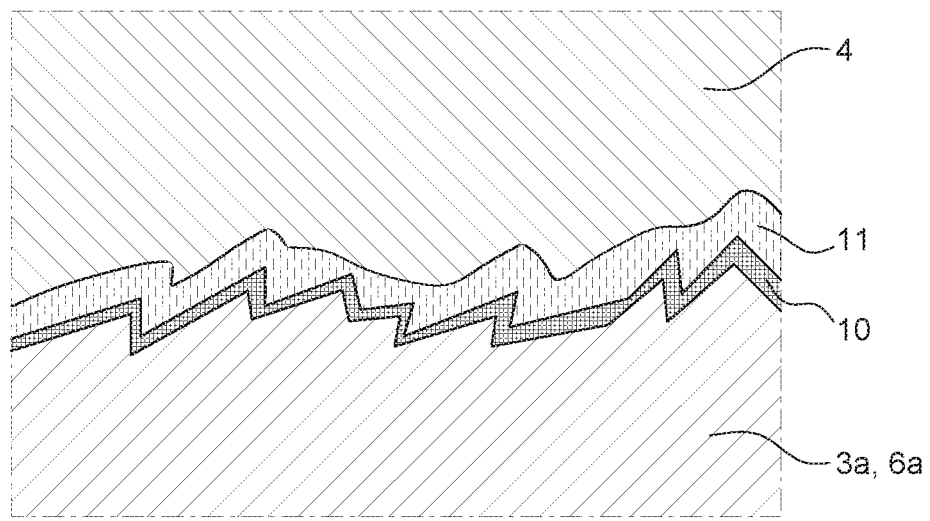
FIG. 7 schematically represents different layers which may, according to preferred variants, be deposited on the assembly surfaces before bonding.

To improve the adhesion of the adhesive joint, the surfaces to be assembled may have been treated, or functionalized before the adhesive joint is deposited. More specifically, they may first be subjected to reactive sandblasting, also called silicatization, which consists in sandblasting the surface with silica coated alumina particles. This results in the deposition of a silicatized layer 10 shown schematically in FIG. 7. Next, the surfaces may optionally be functionalized by depositing an adhesion promoter 11 comprising, for example, silane groups whose alkoxyl functions are intended to form a chemical bond with silicatized layer 10, and including other functions intended to bond chemically with the adhesive. Depending on the type of adhesive, these may be, for example, amine or acrylate groups. It will be noted that an adhesion promoter may be provided on the surfaces to be bonded without pre-sandblasting.

After bonding, the next step schematically shown in FIG. 1b consists in introducing at least the solid active materials 8 into the structure before sealing the casing. 'Active materials' means non-liquid active materials such as dry or paste-like anode or cathode materials and possibly the separator, and the liquid active material such as the electrolyte. The active materials are either disposed in the bonded structure (configuration of FIGS. 1-4), or in third part 7 (FIG. 6 configuration). It is also possible to envisage arranging the active materials in the bonded structure and in the third part (FIG. 5).

Next, in a third step, the casing is finished by welding between the bonded structure and third part 7 intended to define the casing bottom. This third part is placed against the edge of the opening in the second part that was used for inserting the first part. Welding may be achieved with or without the addition of filler material. Different types of welding (ultrasonic, brazing, etc.) are envisaged. The preference is for laser welding, which has the advantage of providing a significant source of highly localised heat which is rapidly dissipated without risk of compromising the strength of the casing or of the active material.

In different variants, welded joint 5 may be positioned at different places on the cup. The design with the welded joint positioned between side wall 2b and rim 2c of the cup (FIG. 6) is advantageous since it can ensure conductivity between the bottom and the side portion of the cup without any stress on the weld. This assembly also offers the advantage of being simple to achieve.

Finally, it is to be noted that the method according to the invention was described with a step of filling all the active materials occurring between the bonding step and the welding step. It is important to emphasise that it is mainly the liquid active material, namely the electrolyte, which must be introduced after the bonding step to avoid dirtying the surfaces to be assembled and contaminating the adhesive. It is thus possible to envisage introducing the dry or paste-like anode material before the step of bonding the lid. Thus, it is possible to envisage positioning separator 8a in the lower portion of adhesive joint 4 prior to curing to hold it in place, while ensuring that the adhesive curing temperature is not too high (FIG. 2). Likewise, the present invention does not preclude introducing the electrolyte after welding the assembly via an orifice made in the cup or the lid and which will be subsequently closed, preferably by a weld.

KEY TO DRAWINGS (1) Casing
(2) Cup
   (a) Bottom
   (b) Side wall
   (c) Rim, turned towards the interior of the cup
(3) Lid or first part
   (a) Bonding surface
(4) Adhesive joint
   (a) Portion not parallel to the general axis
   (b) Portion parallel to the general axis
(5) Welded joint
(6) Second part
   (a) Bonding surface
(7) Third part
(8) Active materials
   (a) Separator
(9) Spacer, incorporated in the adhesive joint
(10) Silica layer
(11) Adhesion promoter layer
(12) General axis of the casing coincident with its central axis

What is claimed is:

1. A method for manufacturing a button cell battery comprising a casing which defines a first pole and a second pole of the button cell battery, the general alignment of said first and second poles defining a general axis of the button cell battery;

the method comprising the following successive steps:
   providing at least three parts, with a first part intended to form the first pole, a second part and a third part intended to form together the second pole, the first and second parts respectively having a first surface and a second surface with matching respective shapes and intended to be assembled by bonding to form an isolating joint between the first and second poles;
   bonding the first and second surfaces to provide a structure formed of the first and second parts with an adhesive joint therebetween which is arranged to electrically isolate said first and second parts;
   at least partially filling said structure and/or said third part with at least one solid active material, the third part being fillable prior to one or other of the preceding steps;

welding the third part to the second part, said second and third parts thus having a welded joint;

the first, second and third parts being formed and assembled such that a first portion of the first part, at least partially defining the first surface, and a second portion of the second part, at least partially defining the second surface, are arranged one opposite the other and extend in a surface non-parallel to the general axis of the casing, the second and third parts being welded together to form a cup with said second portion forming a stop, in the direction of said general axis, for the first portion, which is located inside the cup relative to said stop, the second surface being an inner surface of the cup against which said adhesive joint is arranged, the first part closing the cup in a sealed manner with the aid of the adhesive joint.

2. The method according to claim 1, wherein, relative to said general axis, said second part has a minimum inner cross-section throughout the height of said second part, between an opening on one side and the aforementioned stop on the other side, said minimum inner cross-section having dimensions that are arranged to be greater than corresponding dimensions of the first part in projection into a plane transverse to the general axis; and wherein, in said bonding step, said first part is inserted through said opening into the second part and moved substantially along said general axis until said first portion is assembled to the second portion by an adhesive layer located therebetween and forming said adhesive joint.

3. The method according to claim 1, wherein the adhesive joint has a constant thickness controlled by means of a separator.

4. The method according to claim 1, wherein said first and second surfaces are, prior to bonding, treated by reactive sandblasting to deposit a silica layer on each of said first and second surfaces.

5. The method according to claim 4, wherein the first and second surfaces are functionalized by depositing a layer of an adhesion promoter on each of the silica layers pre-deposited on said first and second surfaces.

6. The method according to claim 1, wherein said third part and/or said structure is also filled with a liquid active material prior to said welding step.

7. The method according to claim 1, wherein said first and second portions are flat.

8. The method according to claim 1, wherein said first and second portions are truncated.

* * * * *

UNITED STATES PATENT AND TRADEMARK OFFICE
CERTIFICATE OF CORRECTION

PATENT NO. : 10,505,159 B2  
APPLICATION NO. : 15/879596  
DATED : December 10, 2019  
INVENTOR(S) : Pierry Vuille et al.

Page 1 of 1

It is certified that error appears in the above-identified patent and that said Letters Patent is hereby corrected as shown below:

On the Title Page

Column 1, Item (72) Inventors: after Burhan Yildiz, Frenkendorf (CH), insert -- ; --, therefor.

Column 1, Item (72) Inventors: after Burhan Yildiz, Frenkendorf (CH);, add -- Olga Reinauer, Neuchatel (CH); Michael Stalder, Bellmund (CH) --, therefor.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*